United States Patent
Yamamoto et al.

(10) Patent No.: US 9,302,670 B2
(45) Date of Patent: Apr. 5, 2016

(54) CONTROL APPARATUS FOR VEHICLE

(71) Applicants: Koji Yamamoto, Okazaki (JP); Takayoshi Okuda, Nagoya (JP); Hideaki Yaguchi, Toyota (JP); Toshiya Hashimoto, Miyoshi (JP)

(72) Inventors: Koji Yamamoto, Okazaki (JP); Takayoshi Okuda, Nagoya (JP); Hideaki Yaguchi, Toyota (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 13/718,731

(22) Filed: Dec. 18, 2012

(65) Prior Publication Data
US 2013/0179018 A1 Jul. 11, 2013

(30) Foreign Application Priority Data
Jan. 5, 2012 (JP) ................. 2012-000768

(51) Int. Cl.
| | |
|---|---|
| F02N 19/00 | (2010.01) |
| B60W 20/00 | (2006.01) |
| F02D 41/06 | (2006.01) |
| B60W 10/06 | (2006.01) |
| B60W 10/08 | (2006.01) |
| B60K 6/445 | (2007.10) |

(52) U.S. Cl.
CPC ............ *B60W 20/40* (2013.01); *B60K 6/445* (2013.01); *B60W 10/06* (2013.01); *B60W 10/08* (2013.01); *B60W 20/1082* (2013.01); *F02D 41/06* (2013.01); *F02D 41/062* (2013.01); *F02N 19/00* (2013.01); *F02N 19/004* (2013.01); *B60Y 2300/432* (2013.01); *B60Y 2300/474* (2013.01); *F02N 2200/08* (2013.01); *F02N 2300/2002* (2013.01); *Y02T 10/54* (2013.01); *Y02T 10/6239* (2013.01); *Y02T 10/6286* (2013.01); *Y10S 903/93* (2013.01)

(58) Field of Classification Search
CPC ..... F02D 41/062; F02D 41/06; F02N 19/004; F02N 2200/08; F02N 2300/2002; F02N 2200/10; F02N 2200/00; F02N 19/00; B60W 20/40; B60W 10/06; B60W 10/08; B60W 20/1082; B60K 6/445; B60Y 2300/432; B60Y 2300/474; Y02T 10/54; Y02T 10/6239; Y02T 10/6286; Y10S 903/93
See application file for complete search history.

(56) References Cited

U.S. PATENT DOCUMENTS 6,340,016 B1 * 1/2002 Ueda et al. .................. 123/305
6,488,107 B1 12/2002 Ochiai et al.
(Continued)

FOREIGN PATENT DOCUMENTS

| | | |
|---|---|---|
| EP | 2 206 622 A1 | 7/2010 |
| GB | 2 413 999 A | 11/2005 |

(Continued)

*Primary Examiner* — Helal A Algahaim
*Assistant Examiner* — Genna Mott
(74) *Attorney, Agent, or Firm* — Oliff PLC (57) ABSTRACT

In a control apparatus for a vehicle, an ECU includes an operation reception unit that receives depression of a power switch (i.e., a vehicle system activation operation is performed) in a "ready-off state" as a non-drivable state, and a control execution unit that executes, when the vehicle system activation operation is received by the operation reception unit during running of a hybrid vehicle HV and an engine is started, a startability improvement control for improving startability of the engine as compared with the startability thereof when the vehicle system activation operation is received by the operation reception unit during stop of the hybrid vehicle HV and the engine is started.

12 Claims, 7 Drawing Sheets

(56) References Cited

U.S. PATENT DOCUMENTS

| | | | |
|---|---|---|---|
| 6,504,259 B1* | 1/2003 | Kuroda | B60K 6/46 180/65.25 |
| 2002/0116113 A1* | 8/2002 | Kaneko | F02D 41/065 701/112 |
| 2006/0100056 A1 | 5/2006 | Yamauchi | |
| 2007/0175679 A1 | 8/2007 | Endo et al. | |
| 2008/0077308 A1* | 3/2008 | Laubender | 701/113 |
| 2010/0006358 A1 | 1/2010 | Ishikawa | |
| 2010/0094498 A1 | 4/2010 | Watanabe et al. | |
| 2010/0300386 A1 | 12/2010 | Asami et al. | |
| 2010/0318249 A1 | 12/2010 | Jinno et al. | |
| 2011/0054765 A1* | 3/2011 | Lewis et al. | 701/112 |
| 2015/0006065 A1 | 1/2015 | Yamamoto et al. | |

FOREIGN PATENT DOCUMENTS

| | | |
|---|---|---|
| JP | 2001-065385 A | 3/2001 |
| JP | A-2002-242724 | 8/2002 |
| JP | A-2003-134605 | 5/2003 |
| JP | A-2005-30281 | 2/2005 |
| JP | 2006-132466 A | 5/2006 |
| JP | 2006-283735 A | 10/2006 |
| JP | A-2007-23919 | 2/2007 |
| JP | A-2007-76580 | 3/2007 |
| JP | 2007-170205 A | 7/2007 |
| JP | 2007-203835 A | 8/2007 |
| JP | A-2008-162491 | 7/2008 |
| JP | 2010-095090 A | 4/2010 |
| JP | A-2010-275888 | 12/2010 |

* cited by examiner

CONTROL APPARATUS FOR VEHICLE

INCORPORATION BY REFERENCE

The disclosure of Japanese Patent Application No. 2012-000768 filed on Jan. 5, 2012 including the specification, drawings and abstract is incorporated herein by reference in its entirety.

BACKGROUND OF THE INVENTION

1. Field of the Invention

The invention relates to a control apparatus for a vehicle on which a running drive source is mounted. In particular, the invention relates to a control apparatus for a hybrid vehicle on which an internal combustion engine and a motor are mounted as the drive sources.

2. Description of Related Art

In order to improve fuel efficiency performance, there is a vehicle in which, an engine (corresponds to an "internal combustion engine") is stopped when a predetermined engine stop condition is satisfied (hereinafter the "stop" of the engine is also referred to as "automatic stop") and, the restart of the engine is performed when a predetermined restart condition is satisfied after the engine is stopped (hereinafter, the "restart" of the engine is also referred to as "automatic restart" or "automatic start"). Various technologies are proposed in order to solve various problems related to the vehicle that performs the "automatic stop" and the "automatic restart" of the engine.

For example, there is disclosed an engine start control system in which, in a normal mode, the engine is started by pushing a push switch while stepping on a brake. On the other hand, in a fail-safe mode at the time of engine stalling, detection of brake pedal depression by a brake sensor is excluded from an engine start condition (see Japanese Patent Application Publication No. 2007-23919 (JP-2007-23919 A)). According to the engine start control system, since the detection of the brake pedal depression by the brake sensor is excluded from the engine start condition in the fail-safe mode at the time of engine stalling, it is possible to restart the engine without producing large deceleration while maintaining the running state of the vehicle.

However, in the engine start control system described in JP-2007-23919 A mentioned above, there is a possibility that the engine cannot be reliably started during the running of the vehicle due to deterioration of a combustion condition or the like.

On the other hand, the hybrid vehicle on which the internal combustion engine and the motor are mounted as the drive sources has a power switch (see FIG. 3) for switching between a "ready-on state" as a state where the vehicle can be driven (i.e., a state where at least one of the internal combustion engine and the motor can output a driving force) and a "ready-off state" as a state where the vehicle cannot be driven.

When the power switch is operated by mistake during the running of the vehicle and the "ready-off state" is established, a driver desires to quickly and reliably establish the "ready-on state". However, when it is not possible to reliably start the engine during the running of the vehicle due to the deterioration of the combustion condition or the like so that the start of the engine fails or it takes time to start the engine, there are cases where it is difficult for the driver to realize that the operation for establishing the "ready-on state" is received. In such cases, it follows that the driver repeatedly executes the operation for establishing the "ready-on state" (e.g., depression operation of the power switch) until the start of the engine is confirmed.

SUMMARY OF THE INVENTION

The invention provides a control apparatus for a vehicle capable of reliably starting an internal combustion engine during running of the vehicle.

In order to solve the above problem, the control apparatus for a vehicle according to the invention is configured in the following manner.

That is, a first aspect of the invention relates to a control apparatus for a vehicle. The control apparatus for a vehicle is a control apparatus for a vehicle on which an internal combustion engine and a motor are mounted as drive sources. The control apparatus includes an operation reception unit that receives a vehicle system activation operation for allowing at least one of the internal combustion engine and the motor to output a driving force, and a control execution unit that executes, when the vehicle system activation operation is received by the operation reception unit during miming of the vehicle, a startability improvement control for improving startability of the internal combustion engine as compared with the startability of the internal combustion engine when the vehicle system activation operation is received by the operation reception unit during stop of the vehicle.

According to the control apparatus for a vehicle, in the vehicle on which the internal combustion engine and the motor are mounted as the drive sources (i.e., what is called a hybrid vehicle), when the vehicle system activation operation for allowing at least one of the internal combustion engine and the motor to output the driving force is received during the running of the vehicle, since the startability improvement control for improving the startability of the internal combustion engine as compared with the startability thereof when the vehicle system activation operation is received during the stop of the vehicle is executed, it is possible to reliably restart the internal combustion engine when the vehicle system activation operation is received. In addition, in the other cases (e.g., a case where a running mode is changed from an "EV running mode" to a "normal running mode"), it is possible to start the internal combustion engine while improving drivability and suppressing deterioration of fuel efficiency.

In addition, a second aspect of the invention relates to a control apparatus for a vehicle. The control apparatus for a vehicle is a control apparatus for a vehicle on which an internal combustion engine is mounted as a drive source. The control apparatus includes an operation reception unit that receives an operation for starting the internal combustion engine, and a control execution unit that executes, when the operation for starting the internal combustion engine is received by the operation reception unit during running of the vehicle, a startability improvement control for improving startability of the internal combustion engine as compared with the startability of the internal combustion engine when the operation for starting the internal combustion engine is received by the operation reception unit during stop of the vehicle.

According to the control apparatus for a vehicle, in the vehicle having only the internal combustion engine as the drive source (what is called a conventional vehicle), when the operation for starting the internal combustion engine is received during the running of the vehicle, since the startability improvement control for improving the startability of the internal combustion engine as compared with the startability thereof when the operation for starting the internal combustion engine is received during the stop of the vehicle is executed, it is possible to reliably start the internal combustion engine during the running of the vehicle. In addition, in the other cases (e.g., in the case of "automatic restart"), it is possible to start the internal combustion engine while improving the drivability and suppressing the deterioration of fuel efficiency.

Further, a third aspect of the invention relates to a control apparatus for a vehicle. The control apparatus for a vehicle is a control apparatus for a vehicle on which an internal combustion engine and a motor are mounted as drive sources including an operation reception unit that receives a vehicle system activation operation for allowing at least one of the internal combustion engine and the motor to output a driving force, a stop unit that stops the internal combustion engine when a stop condition for stopping the internal combustion engine is satisfied, a start unit that starts the internal combustion engine when a start condition for starting the internal combustion engine is satisfied after the internal combustion engine is stopped by the stop unit, and a control execution unit that executes, when the vehicle system activation operation is received by the operation reception unit during running of the vehicle, a startability improvement control for improving startability of the internal combustion engine as compared with the startability of the internal combustion engine when the internal combustion engine is started by the start unit during the running of the vehicle.

According to the control apparatus for a vehicle, in the vehicle on which the internal combustion engine and the motor are mounted as the drive sources (i.e., what is called the hybrid vehicle), when the stop condition for stopping the internal combustion engine is satisfied, the internal combustion engine is stopped. Then, after the internal combustion engine is stopped, when the start condition for starting the internal combustion engine is satisfied, the internal combustion engine is started. In addition, when the vehicle system activation operation for allowing at least one of the internal combustion engine and the motor to output the driving force is received during the running of the vehicle, the startability improvement control for improving the startability of the internal combustion engine as compared with when the start condition is satisfied during the running of the vehicle engine is started is executed. Consequently, it is possible to reliably start the internal combustion engine during the running of the vehicle by performing the vehicle system activation operation.

Furthermore, a fourth aspect of the invention relates to a control apparatus for a vehicle. The control apparatus for a vehicle is a control apparatus for a vehicle on which an internal combustion engine is mounted as a drive source. The control apparatus includes an operation reception unit that receives a start operation for starting the internal combustion engine, a stop unit that stops the internal combustion engine when a stop condition for stopping the internal combustion engine is satisfied, a start unit that starts the internal combustion engine when a start condition for starting the internal combustion engine is satisfied after the internal combustion engine is stopped by the stop unit, and a control execution unit that executes, when the start operation is received by the operation reception unit during running of the vehicle, a startability improvement control for improving startability of the internal combustion engine as compared with the startability of the internal combustion engine when the internal combustion engine is started by the start unit during the running of the vehicle.

According to the control apparatus for a vehicle, in the vehicle having only the internal combustion engine as the drive source (what is called the conventional vehicle), when the stop condition for stopping the internal combustion engine is satisfied, the internal combustion engine is stopped. Then, after the internal combustion engine is stopped, when the start condition for starting the internal combustion engine is satisfied, the internal combustion engine is started. In addition, when the start operation is received during the running of the vehicle, the startability improvement control for improving the startability of the internal combustion engine as compared with when the start condition is satisfied during the running of the vehicle and the internal combustion engine is started is executed. Consequently, it is possible to reliably start the internal combustion engine during the running of the vehicle by performing the start operation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention will be described with reference to the drawings. In the embodiment, a description will be given of a case where a "control apparatus for a vehicle" according to the invention is applied to a front-engine, front-drive (FF) hybrid vehicle.

Figure 1:
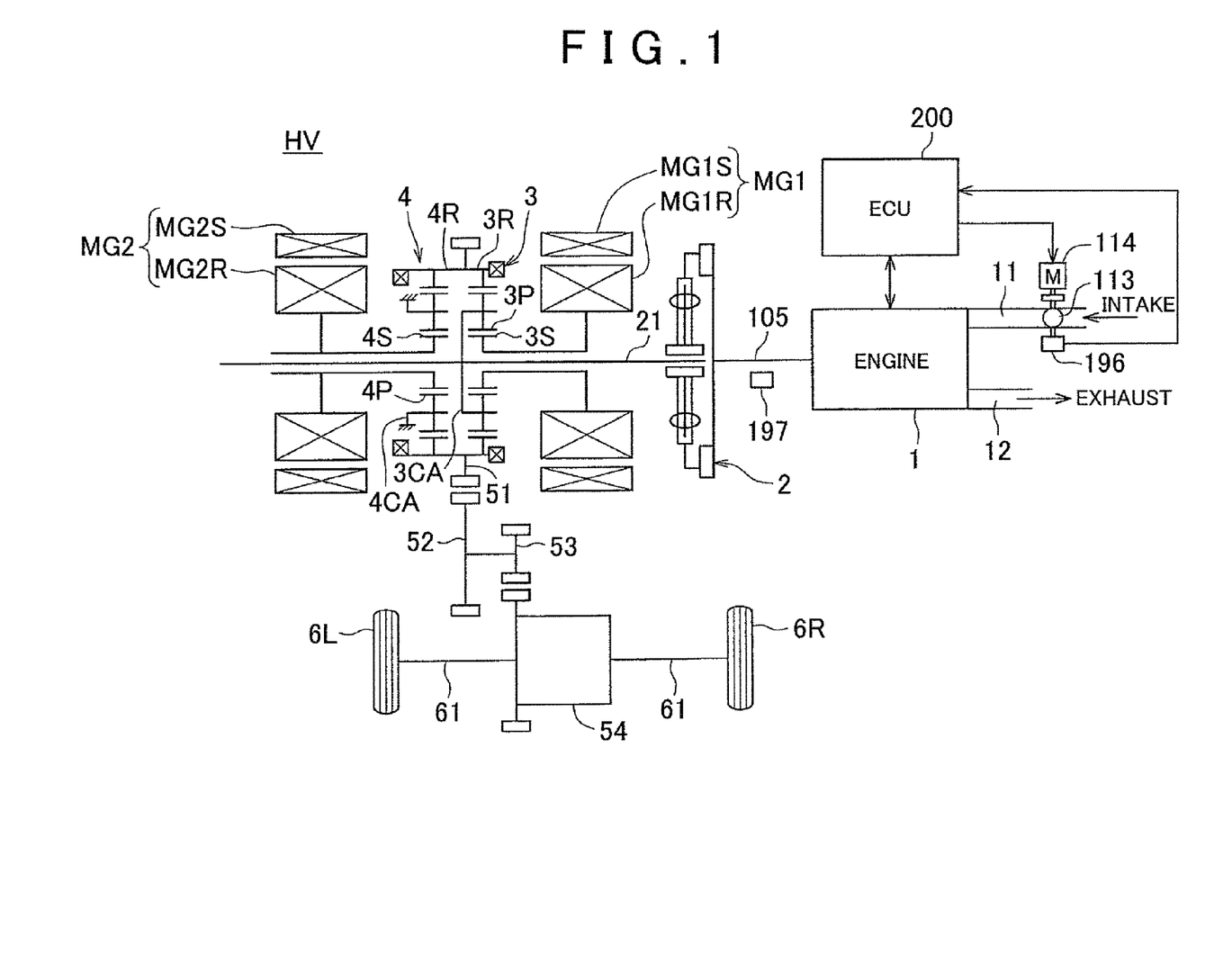
FIG. 1 is a schematic structural view showing an example of a hybrid vehicle on which a control apparatus for a vehicle according to the invention is mounted.

FIG. 1 is a schematic structural view showing an example of a hybrid vehicle HV on which the "control apparatus for a vehicle" according to the invention is mounted. As shown in FIG. 1, the hybrid vehicle HV includes an engine 1, a first motor generator MG1, a second motor generator MG2, a power dividing mechanism 3, a reduction mechanism 4, a counter drive gear 51, a counter driven gear 52, a final gear 53, a differential device 54, a front wheel axle (drive shaft) 61, left and right driving wheels (front wheels) 6L and 6R, and an ECU 200. The engine 1 generates a driving force for running of the vehicle. The first motor generator MG1 functions mainly as a generator. The second motor generator MG2 functions mainly as a motor. By executing a program stored in a read only memory (ROM) or the like of the ECU 200, the "control apparatus for a vehicle" according to the invention is implemented.

Figure 4:
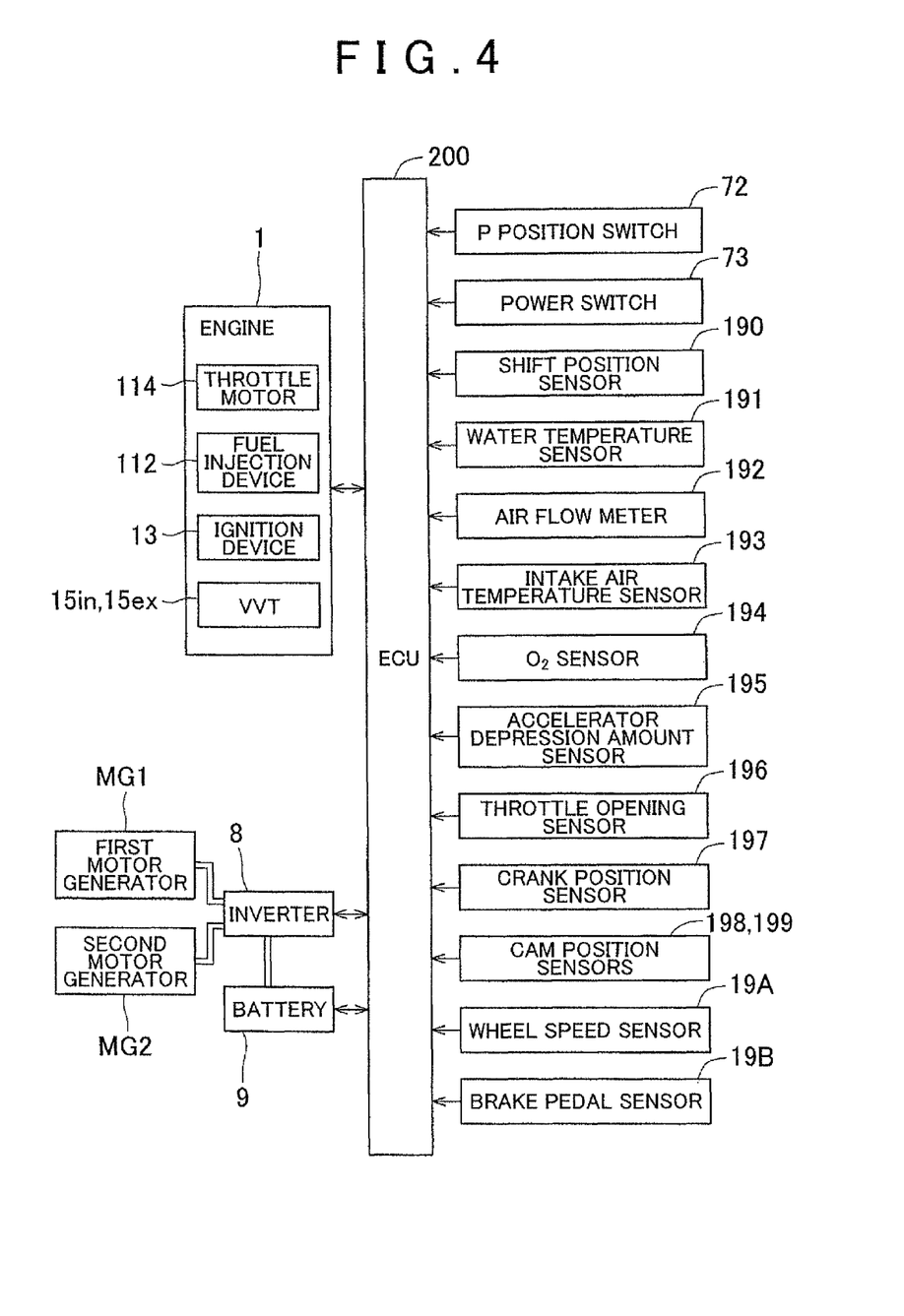
FIG. 4 is a block diagram showing an example of input and output of an electronic control unit (ECU) shown in FIG. 1.

Note that the ECU 200 (an electronic control unit) is constituted by, e.g., a hybrid (HV) ECU that collectively controls the hybrid vehicle HV, an inverter ECU that controls the drive of an inverter 8 (see FIG. 4), an engine ECU that controls the drive of the engine 1, and a battery ECU that manages the state of a battery 9 (see FIG. 4). These ECUs are connected to each other such that they can communicate with each other.

Next, a description will be given of each of the engine 1, the motor generators MG1 and MG2, the power dividing mechanism 3, the reduction mechanism 4, and the ECU 200 and the like.

Figure 2:
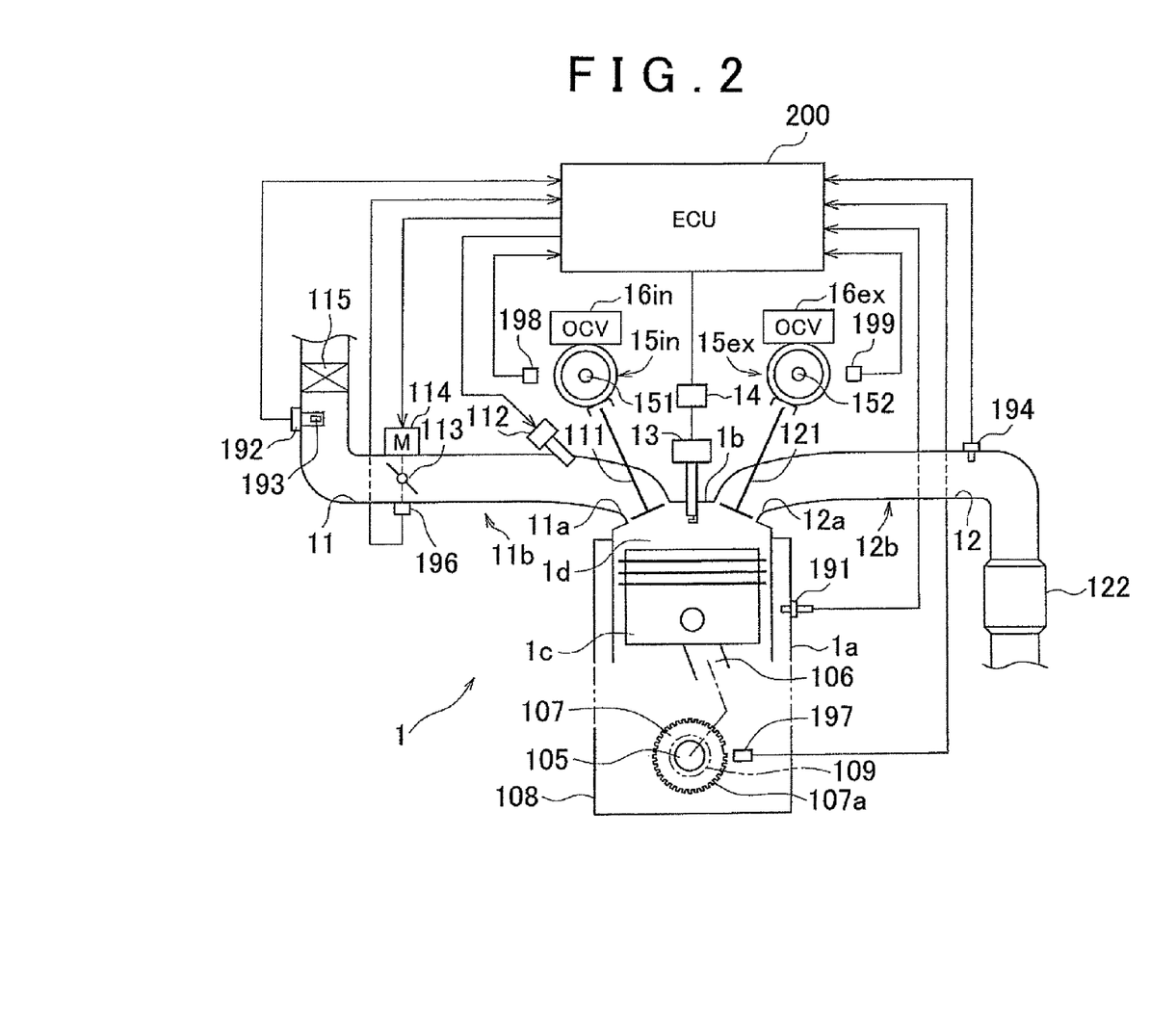
FIG. 2 is a structural view showing an example of an engine shown in FIG. 1.

First, the engine 1 will be described with reference to FIG. 2. FIG. 2 is a structural view showing an example of the engine 1 shown in FIG. 1. Note that FIG. 2 shows the structure of only one cylinder of the engine 1. Note that the engine 1 can be regarded as an "internal combustion engine" of the invention.

The engine 1 is a port-injection multi-cylinder gasoline engine, and a piston 1c that vertically reciprocates is provided in a cylinder block 1a constituting each cylinder of the engine 1. The piston 1c is coupled to a crankshaft 105 via a connecting rod 106 and the reciprocation of the piston 1c is converted into the rotation of the crankshaft 105 by the connecting rod 106.

A signal rotor 107 is attached to the crankshaft 105. A plurality of protrusions (teeth) 107a are provided at regular angular intervals on the outer peripheral surface of the signal rotor 107. A crank position sensor (engine speed sensor) 197 is disposed in the vicinity of the side of the signal rotor 107. The crank position sensor 197 is, e.g., an electromagnetic pickup, and generates a pulse-like signal (output pulse) corresponding to the protrusion 17a of the signal rotor 17 when the crankshaft 105 rotates.

A water temperature sensor 191 that detects a cooling water temperature is disposed in the cylinder block 1a of the engine 1. In addition, a cylinder head 1b is provided at the upper end of the cylinder block 1a, and a combustion chamber 1d is formed between the cylinder head 1b and the piston 1c. An ignition device (ignition plug) 13 is disposed in the combustion chamber 1d of the engine 1. The ignition timing of the ignition device 13 is adjusted by an igniter 14.

An oil pan 108 in which lubricating oil is stored is provided in the lower portion of the cylinder block 1a of the engine 1. The lubricating oil stored in the oil pan 108 is pumped up by an oil pump 109 via an oil strainer that removes a foreign object during the operation of the engine 1. The lubricating oil is supplied to the piston 1c, the crankshaft 105, and the connecting rod 106 and is used to lubricate and cool the individual portions. The lubricating oil thus supplied is returned to the oil pan 108 after being used to lubricate and cool the individual portions of the engine 1, and is stored in the oil pan 108 until the lubricating oil is pumped up by the oil pump 109 again.

In addition, in the embodiment, the lubricating oil stored in the oil pan 108 is also used as hydraulic oil for variable valve timing mechanisms (hereinafter also referred to as VVT mechanisms) 15in and 15ex described later.

An intake passage 11 and an exhaust passage 12 are connected to the combustion chamber 1d of the engine 1. A part of the intake passage 11 is formed of an intake port 11a and an intake manifold 11b. A part of the exhaust passage 12 is formed of an exhaust port 12a and an exhaust manifold 12b.

In the intake passage 11, there are disposed an air cleaner 115, a hot-wire-type air flow meter 192, an intake air temperature sensor 193 provided in the air flow meter 192, and an electronically controlled throttle valve 113 for adjusting the intake air amount of the engine 1. The throttle valve 113 is driven by a throttle motor 114. The opening of the throttle valve 113 is detected by a throttle opening sensor 196. In the exhaust passage 12 of the engine 1, an $O_2$ sensor 194 that detects an oxygen concentration in exhaust gas and a three-way catalyst 122 are disposed.

Next, with reference to FIG. 2, a description will be given of the VVT mechanisms 15in and 15ex that control an opening/closing timing of each of an intake valve 111 and an exhaust valve 121. As shown in FIG. 2, the intake valve 111 is provided between the intake passage 11 and the combustion chamber 1d. By opening or closing the intake valve 111, the intake passage 11 and the combustion chamber 1d are caused to communicate with or are separated from each other. In addition, the exhaust valve 121 is provided between the exhaust passage 12 and the combustion chamber 1d. By opening or closing the exhaust valve 121, the exhaust passage 12 and the combustion chamber 1d are caused to communicate with or are separated from each other.

The opening/closing drive of the intake valve 111 and the exhaust valve 121 is carried out with the rotation of each of an intake camshaft 151 and an exhaust camshaft 152 to which the rotation of the crankshaft 105 is transmitted via a timing belt and the like. At the end portions of the intake camshaft 151 and the exhaust camshaft 152, the intake VVT mechanism 15in and the exhaust VVT mechanism 15ex are provided respectively. To the intake VVT mechanism 15in and the exhaust VVT mechanism 15ex, oil control valves (hereinafter referred to as OCVs) 16in and 16ex that control the oil pressure of the hydraulic oil are connected.

With the OCV 16in, it is possible to arbitrarily adjust the valve timing of the intake valve 111 in a range from the most retarded angle position to the most advanced angle position. Similarly, with the OCV 16ex, it is possible to arbitrarily adjust the valve timing of the exhaust valve 121 in a range from the most retarded angle position to the most advanced angle position. Note that, since the detailed structure and operation of each of the intake VVT mechanism 15in, the exhaust VVT mechanism 15ex, and the OCVs 16in and 16ex is commonly available (see, e.g., Japanese Patent Application Publication No. 2010-275888 (JP-2010-275888 A)), the description thereof will be omitted.

In addition, in the vicinity of the intake camshaft 151 and the exhaust camshaft 152, cam position sensors 198 and 199 are disposed. Each of the cam position sensors 198 and 199 is, e.g., an electromagnetic pickup, and is disposed so as to oppose one protrusion (not shown) on the outer peripheral surface of a rotor provided integrally with each of the intake camshaft 151 and the exhaust camshaft 152. The cam position sensors 198 and 199 output pulse-like signals when their respective camshafts 151 and 152 rotate.

In the intake passage 11, an injector (fuel injection device) 112 for fuel injection is disposed. Fuel having a predetermined pressure is supplied to the fuel injection device 112 from a fuel tank by a fuel pump, and the fuel is injected into the intake port 11a in the intake passage 11. The injected fuel is mixed with intake air to become an air-fuel mixture, and the air-fuel mixture is introduced into the combustion chamber 1d of the engine 1. The air-fuel mixture introduced into the combustion chamber 1d (herein, the air-fuel mixture="fuel+ air") is ignited by the ignition device 13 and is combusted and exploded. With the combustion and explosion of the air-fuel mixture in the combustion chamber 1d, the piston 1c reciprocates to cause the crankshaft 105 to rotate.

In addition, as shown in FIG. 1, the output of the engine 1 is transmitted to an input shaft 21 via the crankshaft 105 and a damper 2. The damper 2 absorbs a torque fluctuation of the engine 1, and is, e.g., a coil spring-type transaxle damper.

Next, with reference to FIG. 1, a description will be given of the first motor generator MG1 and the second motor generator MG2. The first motor generator MG1 is an alternating current synchronous generator that includes a rotor MG1R made of a permanent magnet supported rotatably relative to the input shaft 21, and a stator MG1S having a three-phase coil wound therearound. The first motor generator MG1 functions as a generator and also functions as a motor (electric motor). Note that the first motor generator MG1 can be regarded as a part of a "motor" of the invention.

In addition, similarly to the first motor generator MG1, the second motor generator MG2 is also the alternating current synchronous generator that includes a rotor MG2R made of the permanent magnet supported rotatably relative to the input shaft 21, and a stator MG2S having the three-phase coil wound therearound. The second motor generator MG2 functions as the motor (electric motor) and also functions as the generator. The second motor generator MG2 can be regarded as a part of the "motor" of the invention.

The first motor generator MG1 and the second motor generator MG2 are connected to the battery (power storage device) 9 via the inverter 8 (see FIG. 4). The inverter 8 is controlled by the ECU 200, and the regenerative and driving operations of each of the motor generators MG1 and MG2 are controlled by controlling the inverter 8. Regenerative electric power generated by each of the motor generators MG1 and MG2 is stored in the battery 9 via the inverter 8. Further, electric power for driving each of the motor generators MG1 and MG2 is supplied from the battery 9 via the inverter 8.

Next, with reference to FIG. 1, the power dividing mechanism 3 will be described. As shown in FIG. 1, the power dividing mechanism 3 is constituted by a planetary gear mechanism that has a sun gear 3S, a pinion gear 3P, a ring gear 3R, and a planetary carrier 3CA. The sun gear 35 is an external gear that rotates at the center of a plurality of gear elements. The pinion gear 3P is an external gear that circumscribes the sun gear 3S and revolves around the sun gear 3S while rotating. The ring gear 3R is an internal gear that is formed into an annular shape so as to be engaged with the pinion gear 3P. The planetary carrier 3CA supports the pinion gear 3P and rotates through the revolution of the pinion gear 3P. Note that the planetary carrier 3CA is integrally coupled to the input shaft 21 on the engine 1 side to be able to rotate. The sun gear 3S is integrally, coupled to the rotor MG1R of the first motor generator MG1 to be able to rotate.

In addition, the power dividing mechanism 3 transmits the driving force of at least one of the engine 1 and the second motor generator MG2 to the left and right driving wheels 6L and 6R through the counter drive gear 51, the counter driven gear 52, the final gear 53, the differential device 54, and the drive shaft 61.

Next, with reference to FIG. 1, the reduction mechanism 4 will be described. As shown in FIG. 1, the reduction mechanism 4 is constituted by a planetary gear mechanism that has a sun gear 4S, a carrier (transaxle case) 4CA, a pinion gear 4P, and a ring gear 4R. The sun gear 4S is an external gear that rotates at the center of a plurality of gear elements. The pinion gear 4P is an external gear that is rotatably supported by the carrier (transaxle case) 4CA and rotates while circumscribing the sun gear 4S. The ring gear 4R is an internal gear that is formed into an annular shape so as to be engaged with the pinion gear 4P. Note that the ring gear 4R of the reduction mechanism 4, the ring gear 3R of the power dividing mechanism 3, and the counter drive gear 51 are constituted integrally with each other. The sun gear 4S is integrally coupled to the rotor MG2R of the second motor generator MG2, and is rotatable.

In addition, the reduction mechanism 4 reduces the driving force of the second motor generator MG2 at an appropriate reduction gear ratio. The reduced driving force is transmitted to the left and right driving wheels 6L and 6R through the counter drive gear 51, the counter driven gear 52, the final gear 53, the differential device 54, and the drive shaft 61.

Figure 3:
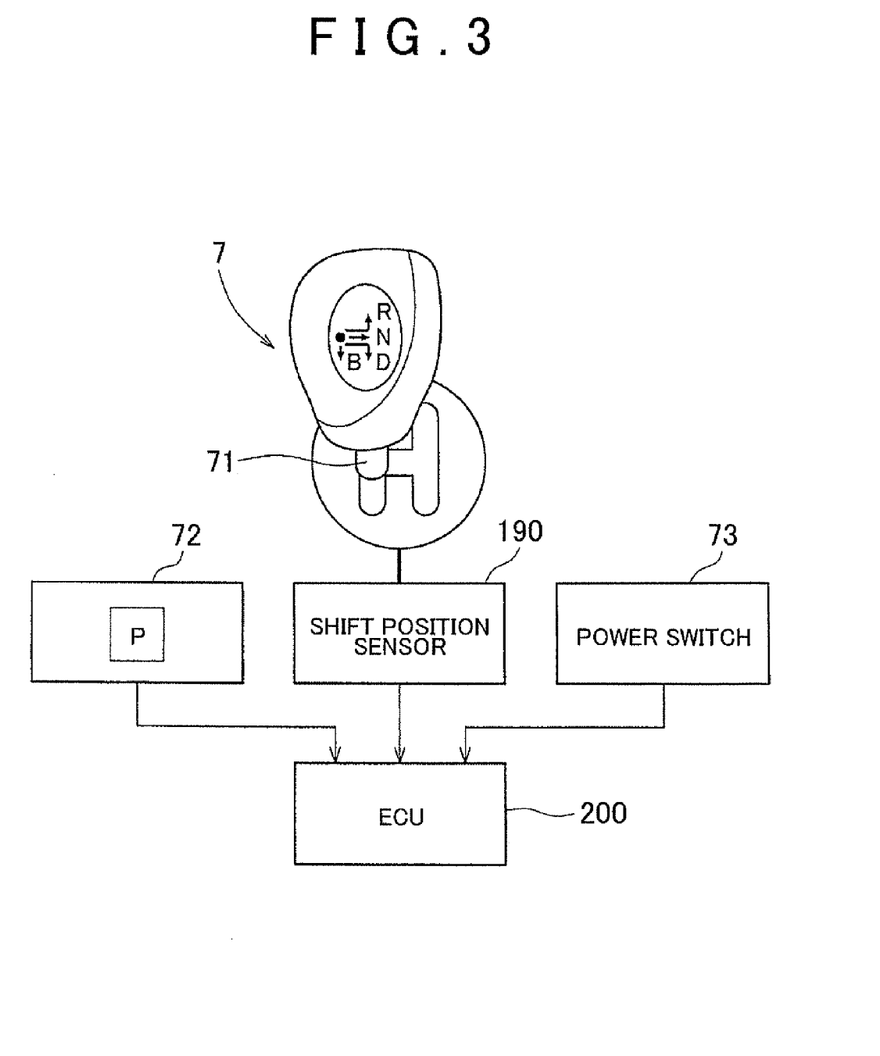
FIG. 3 is a view showing an example of a shift operation device and the like in the hybrid vehicle of FIG. 1.

A shift operation device 7 (see FIG. 3) is disposed in the vicinity of a driver's seat in the hybrid vehicle HV. FIG. 3 is a view showing an example of the shift operation device 7 and the like in the hybrid vehicle of FIG. 1. As shown in FIG. 3, a shift lever 71 is movably provided in the shift operation device 7. In addition, in the shift operation device 7, there are provided a drive position for forward drive (D position), a brake position for forward drive (B position) that controls more braking force (engine braking) when an accelerator is not depressed than the D position, a reverse position for reverse drive (R position), and a neutral position (N position). The shift operation device 7 is constituted such that the driver can move the shift lever 71 to a desired position.

The location of each of the D position, the B position, the R position, and the N position is detected by a shift position sensor 190. An output signal of the shift position sensor 190 is inputted to the ECU 200. Further, a P position switch 72 that receives the setting to a parking position for parking (P position) is provided in the vicinity of, e.g., the shift lever 71. Herein, when the P position switch 72 is depressed by the driver, the P position switch 72 outputs an operation signal indicative of the setting to the parking position (P position) to the ECU 200.

As shown in FIG. 3, in the hybrid vehicle HV, a power switch 73 that is depressed when a drive state is changed is provided. In the hybrid vehicle HV, when the power switch 73 is depressed in a state where drive by at least one of the engine 1, the first motor generator MG1, and the second motor generator MG2 is possible, i.e., a drivable state (hereinafter also referred to as a "ready-on state"), a non-drivable state where the drive by the engine 1, the first motor generator MG1, or the second motor generator MG2 is prohibited (hereinafter also referred to as a "ready-off state") is established. On the other hand, when the power switch 73 is depressed in the "ready-off state" (hereinafter, this operation is referred to as a "vehicle system activation operation"), the "ready-on state" is established. Herein, the power switch 73 can be regarded as a part of an "operation reception unit" of the invention.

In the embodiment, a description will be given of a case where the power switch 73 receives an operation for switching between the "ready-on state" and the "ready-off state". Note that a configuration may also be adopted in which the power switch 73 activates and stops a "hybrid system" (hereinafter also referred to as a "vehicle system"). The "hybrid system" mentioned herein is a system in which the running of the hybrid vehicle HV is controlled by executing various controls including the operation control of the engine 1, the drive control of the motor generators MG1 and MG2, and the coordination control of the engine 1 and the motor generators MG1 and MG2. Specifically, the "hybrid system" is a system that includes the ECU 200 shown in FIG. 4, receives signals from various sensors and switches shown in FIG. 4, and collectively controls the devices related to the running of the vehicle such as the engine 1, the first motor generator MG1, the second motor generator MG2, and the inverter 8 based on the received signals. In the case where the power switch 73 activates and stops the "hybrid system", when the hybrid system is activated by depressing the power switch 73, the "ready-on state" is established. When the hybrid system is stopped by depressing the power switch 73, the "ready-off state" is established. Note that the "control apparatus for a vehicle" according to the invention constitutes a part of the hybrid system.

Next, with reference to FIG. 4, the structure of the ECU 200 will be described. FIG. 4 is a block diagram showing an example of the structure of the ECU 200. The ECU 200 is an electronic control device that executes various controls including the operation control of the engine 1 and the coordination control of the engine 1 and the motor generators MG1 and MG2. In addition, the ECU 200 includes a central processing unit (CPU), a ROM, a random access memory (RAM), and a backup RAM.

The ROM stores various control programs, and tables and maps that are referenced when the various control programs are executed. The CPU executes arithmetic calculation based on the various control programs and maps stored in the ROM. The RAM is a memory that temporarily stores the result of the arithmetic calculation in the CPU and data inputted from the individual sensors. The backup RAM is a nonvolatile memory that stores data to be retained when an ignition switch is OFF.

As shown in FIG. 4, to the ECU 200, there are connected the P position switch 72, the power switch 73, the shift position sensor 190, the water temperature sensor 191, the air flow meter 192, the intake air temperature sensor 193, the $O_2$ sensor 194, an accelerator depression amount sensor 195, the throttle opening sensor 196, the crank position sensor 197, the cam position sensors 198 and 199, a wheel speed sensor 19A, and a brake pedal sensor 19B. The water temperature sensor 191 detects the temperature of engine cooling water. The air flow meter 192 detects the intake air amount. The intake air temperature sensor 193 detects the temperature of the intake air. The accelerator depression amount sensor 195 detects an accelerator depression amount Ace as a depression amount of an accelerator pedal. The crank position sensor 197 outputs a pulse signal every time the crankshaft 105 rotates by a predetermined angle. The wheel speed sensor 19A detects the rotational speed of the wheel. The brake pedal sensor 19B detects a depression force (brake depression force) applied to the brake pedal. Signals from these sensors (or switches) are inputted to the ECU 200. In addition, an air-fuel ratio sensor, a current sensor that detects a charge/discharge current of the battery 9, and a battery temperature sensor that are not shown are also connected to the ECU 200, and signals from these sensors are also inputted to the ECU 200.

Further, to the ECU 200, there are connected the throttle motor 114 that opens and closes the throttle valve 113 of the engine 1, the fuel injection device 112, the ignition device 13, the intake VVT mechanism 15in, and the exhaust VVT mechanism 15ex. The ECU 200 outputs a control signal to the throttle motor 114 based on the output signals from various sensors mentioned above to execute a throttle opening control of the engine 1 (intake air amount control). Further, the ECU 200 outputs the control signal to the fuel injection device 112 based on the output signals from the various sensors to execute a fuel injection amount control of the engine 1. Furthermore, the ECU 200 outputs the control signal to the ignition device 13 based on the output signals from the various sensors to execute an ignition time control of the engine 1. Moreover, the ECU 200 outputs the control signals to the intake VVT mechanism 15in and the exhaust VVT mechanism 15ex respectively, based on the output signals from the various sensors mentioned above to execute a valve timing control of each of the intake valve 111 and the exhaust valve 121 of the engine 1.

Furthermore, in order to manage the state of the battery 9, the ECU 200 determines the state of charge (SOC) of the battery 9 and an input limit Win and an output limit Wout of the battery 9 based on the accumulated value of the charge/discharge current detected by the current sensor and the battery temperature detected by the battery temperature sensor.

In addition, the inverter 8 is connected to the ECU 200. The inverter 8 includes intelligent power modules (IPMs) that control the motor generators MG1 and MG2. Each IPM is constituted by a plurality of (e.g., six) semiconductor switching elements (e.g., an insulated gate bipolar transistor (IGBT)) and the like.

The inverter 8 converts a direct current from the battery 9 to a current for driving the motor generators MG1 and MG2 in accordance with, e.g., a command signal from the ECU 200 (e.g., a torque command value of the first motor generator MG1 and a torque command value of the second motor generator MG2). In addition, the inverter 8 converts an alternating current generated in the first motor generator MG1 by the power of the engine 1 and an alternating current generated in the second motor generator MG2 by the regenerative operation to a direct current for charging the battery 9. Further, the inverter 8 supplies the alternating current generated in the first motor generator MG1 as electric power for driving the second motor generator MG2 in accordance with the running state.

Figure 5:
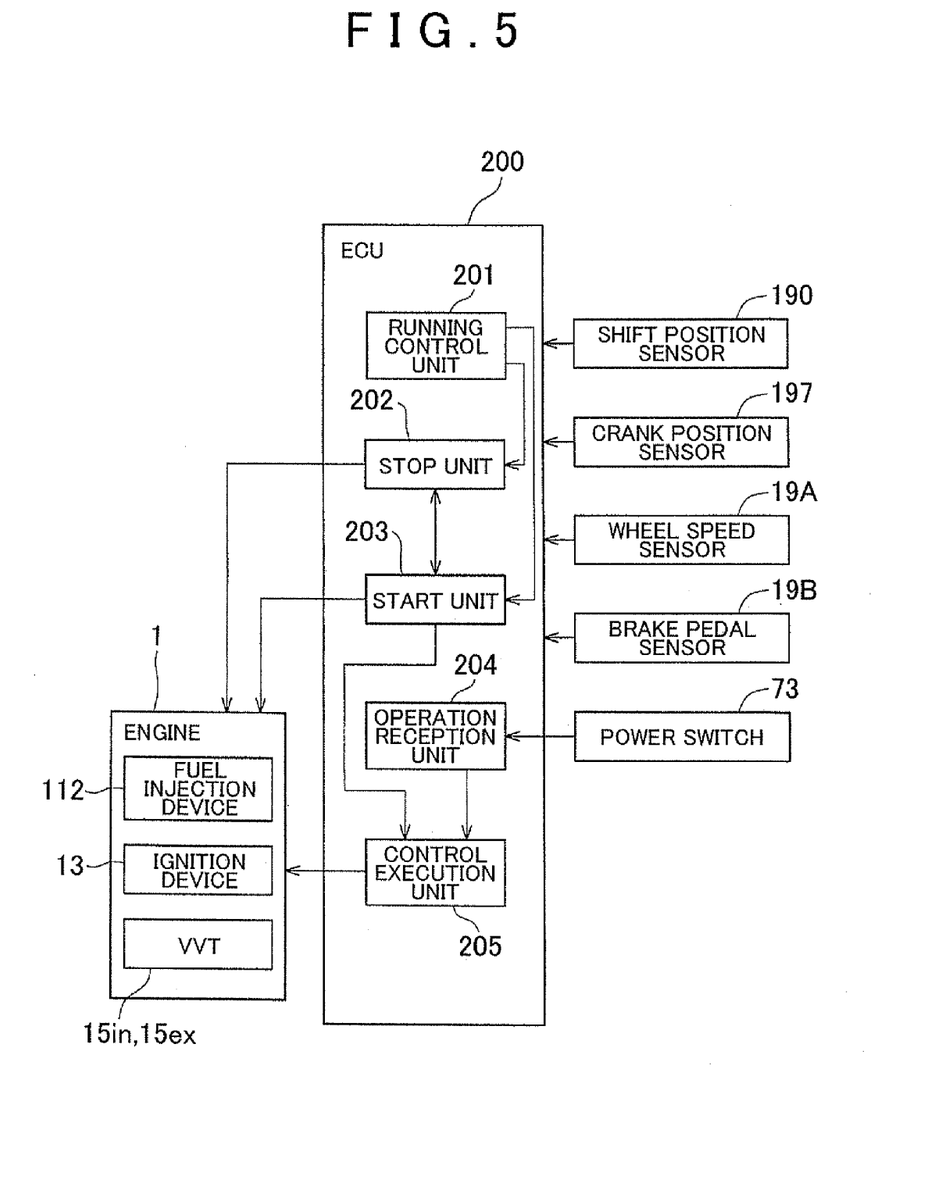
FIG. 5 is a functional structural view showing an example of a principal portion in the control apparatus for a vehicle according to the invention.

Next, the "control apparatus for a vehicle" according to the invention will be described with reference to FIG. 5. FIG. 5 is a functional structural view showing an example of the principal portion in the "control apparatus for a vehicle" according to the invention. The CPU reads and executes the control program stored in the ROM, and the ECU 200 thereby functions as the functional unit of a running control unit 201, a stop unit 202, a start unit 203, an operation reception unit 204, and a control execution unit 205. Herein, the stop unit 202, the start unit 203, the operation reception unit 204, and the control execution unit 205 constitute the "control apparatus for a vehicle" according to the invention.

The running control unit 201 is a functional unit that performs the running control of the hybrid vehicle HV shown in FIG. 1 based on the output signals of the various sensors. The running control unit 201 sets a "running mode" that specifies running states such as an "EV running mode", a "normal running mode", and a "high-speed running mode". In addition, the running control unit 201 requests the stop and restart of the engine 1 based on the operational state of the vehicle and the state of the battery 9.

Herein, with reference to FIG. 1, the running control performed by the running control unit 201 will be described. Note that a description will be given of the running control when the "D position" is set by the shift lever 71 for the sake of convenience. Note that the following control is all performed by the running control unit 201.

First, in a case where the operation efficiency of the engine 1 is poor during low-speed running, or at the time of start of the vehicle, the control is performed such that a running state where the vehicle is driven only by the second motor generator MG2 (hereinafter, this running state is also referred to as the "EV running mode") is established. In addition, in a case where the driver or the like selects the "EV running mode" using a running mode selection switch (not shown) disposed in a vehicle cabin, the control is performed such that the "EV running mode" is set.

Next, during normal running, the control is performed such that a running state where the driving force of the engine 1 is divided into two paths by the power dividing mechanism 3 (torque split), the driving wheels 6L and 6R are directly driven by the engine 1 (driven by a direct torque), and the first motor generator MG1 is driven by the engine 1 and electric power is generated (hereinafter, this running state is also referred to as the "normal running mode") is established. At this point, the second motor generator MG2 is driven with the electric power generated by the first motor generator MG1 and auxiliary driving of the driving wheels 6L and 6R is performed (driving using an electric path).

Thus, the power dividing mechanism 3 functions as a differential mechanism and the main portion of the power from the engine 1 is mechanically transmitted to the driving wheels 6L and 6R by the differential operation. Then, the remaining portion of the power from the engine 1 is electrically transmitted using the electric path from the first motor generator MG1 to the second motor generator MG2, and the function as a transmission with which a speed ratio is electrically changed is thereby exerted. With this, it becomes possible to freely manipulate the rotational speed of the engine and the engine torque without depending on the rotational speed and torque of the driving wheels 6L and 6R (the ring gears 3R and 4R). As a result, it becomes possible to obtain the operational state of the engine in which fuel consumption rate is optimized while the driving force required by the driving wheels 6L and 6R is obtained.

During high-speed running, the control is performed such that a running state where the electric power from the battery (running battery) 9 is further supplied to the second motor generator MG2, the output of the second motor generator MG2 is increased, and the driving force is additionally given (driving force assist) to the driving wheels 6L and 6R (hereinafter, this running state is also referred to as the "high-speed running mode") is established.

Further, during deceleration, the second motor generator MG2 functions as the generator to perform regenerative power generation, and the regenerated electric power is accumulated in the battery 9. Note that, when the charge amount of the battery 9 is lowered and charging is particularly required, the charge amount to the battery 9 is increased by increasing the output of the engine 1 to increase the power generation amount by the first motor generator MG1. As a matter of course, there are cases where a control for increasing the driving force of, the engine 1 is performed even during the low-speed running on an as needed basis. Examples of the cases include the case where charging of the battery 9 is required as described above, a case where auxiliary equipment such as an air conditioner or the like is driven, and a case where the temperature of the cooling water of the engine 1 is increased to a predetermined temperature.

In the hybrid vehicle HV, there are cases where the engine 1 is stopped in order to improve fuel efficiency based on the operational state of the vehicle and the state of the battery 9. Thereafter, the engine 1 is restarted also based on the operational state of the vehicle and the state of the battery 9. Thus, in the hybrid vehicle HV, even when the "ready-on state" is established, the engine 1 is repeatedly stopped and restarted to be intermittently operated.

Returning to FIG. 5, the functional structure of the ECU 200 will be described. The stop unit 202 is a functional unit that stops the engine 1 based on change information on the "running mode" and command information for stopping the engine 1 from the running control unit 201. Herein, the stop unit 202 can be regarded as a "stop unit" of the invention.

In other words, the stop unit 202 is a functional unit that stops the engine 1 when a "stop condition" for stopping the engine 1 is satisfied. Specifically, the stop unit 202 stops the engine 1 by causing the fuel injection device 112 to stop fuel injection and causing the ignition device 13 to stop ignition. The "stop condition" is satisfied when the following first or second condition is satisfied. The first condition: the running mode is changed from the "normal running mode" or the "high-speed running mode" to the "EV running mode" by the running control unit 201. The second condition: the command for stopping the engine 1 is outputted by the running control unit 201. A specific example includes a case where the command for stopping the engine 1 is outputted from the running control unit 201 based on the input limit Win of the battery 9 (a case where the second condition is satisfied).

The start unit 203 is a functional unit that starts the engine 1 based on the change information on the "running mode" and command information for starting the engine 1 from the running control unit 201. Herein, the start unit 203 can be regarded as a "start unit" of the invention.

In other words, the start unit 203 is a functional unit that starts the engine 1 when a "start condition" for starting the engine 1 is satisfied. Specifically, the "start condition" is satisfied when the following third or fourth condition is satisfied. The third condition: the running mode is changed from the "EV mode" to the "normal running mode" or the "high-speed running mode" by the running control unit 201. The fourth condition: the command for starting the engine 1 is outputted by the running control unit 201. Specifically, there are cases where the command for starting the engine 1 is outputted from the running control unit 201 (a case where the fourth condition is satisfied) in a case where charging is particularly required such as, e.g., a case where the SOC of the battery 9 is lowered or the like.

The operation reception unit 204 is a functional unit that receives depression of the power switch 73 (i.e., the "vehicle system activation operation" is performed) in the "ready-off state". Herein, the operation reception unit 204 can be regarded a part of the "operation reception unit" of the invention.

The control execution unit 205 is a functional unit that executes a "startability improvement control" for improving startability of the engine 1 when the vehicle system activation operation is received by the operation reception unit 204 during running of the hybrid vehicle HV and the engine 1 is started as compared with the startability thereof when the vehicle system activation operation is received by the operation reception unit 204 during stop of the hybrid vehicle HV and the engine 1 is started, and starts the engine 1. Herein, the control execution unit 205 can be regarded as a "control execution unit" of the present invention.

Specifically, the "startability improvement control" mentioned herein includes the following six controls. A first control: a control for increasing the fuel injection amount to the engine 1. A second control: a control for starting the fuel injection even when the rotational speed of the engine 1 is low. A third control: a control for prohibiting execution of a catalyst warm-up control for retarding the ignition timing of the engine 1. A fourth control: a decompression control for retarding the opening time of the intake valve of the engine 1. A fifth control: a control for prohibiting execution of a vibration damping control for preventing torque pulsation of the engine 1. A sixth control: a control for prohibiting execution of a control for suppressing a torque shock at an initial combustion of the engine 1.

Hereinbelow, a description will be given of each of the first to sixth controls included in the "startability improvement control". First, the first control is the control for causing the fuel injection device 112 to increase the fuel injection amount as compared with the fuel injection amount at the time of normal start of the engine 1. When the first control is executed, since the fuel injection amount to the engine 1 is increased, ignitability of the air-fuel mixture in the combustion chamber 1d is improved. Consequently, it is possible to improve the startability of the engine 1.

The second control is the control for causing the fuel injection device 112 to start the fuel injection even when the rotational speed of the engine 1 is low (e.g., when the rotational speed of the engine is 500 rpm or less). At the time of the normal start, when the engine 1 is driven by the first motor generator MG1 and the rotational speed of the engine reaches a predetermined speed (e.g., 600 rpm), the fuel injection is started by the fuel injection device 112. On the other hand, when the second control is executed, since the fuel injection is started by the fuel injection device 112 even when the rotational speed of the engine 1 is low, it becomes possible to start the engine even when the rotational speed of the engine 1 is low. Consequently, it is possible to improve the startability of the engine 1.

The third control is the control for prohibiting the ignition device 13 from executing the catalyst warm-up control for retarding the ignition timing of the engine 1. At the time of the first start of a trip (to be precise, when the temperature of the cooling water for cooling the engine 1 is not more than a predetermined value), in order to reduce the emission of NOx and the like, a control for warming up the three-way catalyst 122 shown in FIG. 2 by retarding the ignition timing of the engine 1 (catalyst warm-up control) is normally performed. On the other hand, when the above third control is executed, the catalyst warm-up control for retarding the ignition timing of the engine 1 is not performed on the ignition device 13. Consequently, it is possible to prevent deterioration of the startbility resulting from the retardation of the ignition timing of the engine 1.

The fourth control is the control for executing the decompression control for retarding the opening time of the intake valve 111 of the engine 1 (what is called a "start time decompression control") on the intake VVT mechanism 15in. When the fourth control is executed, since the opening time of the intake valve 111 of the engine 1 is retarded, an effective compression ratio is reduced. Consequently, it is possible to improve the startability of the engine 1.

The fifth control is the control for prohibiting the motor generator MG1 (or the second motor generator MG2) from executing the "vibration damping control" for preventing the torque pulsation of the engine 1. Note that the "vibration damping control" in hybrid vehicles such as the hybrid vehicle HV is a conventional technology (e.g., Japanese Patent Application Publication No. 2008-162491 (JP-2008-162491 A)) so that the description thereof will be omitted. When the fifth control is executed, since the "vibration damping control" for preventing the torque pulsation of the engine 1 is not executed, the torque including the torque pulsation outputted from the engine 1 is not canceled out by the torque outputted from the motor generator MG1. Consequently, it is possible to improve the startability of the engine 1.

The sixth control is the control for prohibiting the motor generator MG2 from executing the "control for suppressing the torque shock at the initial combustion" of the engine 1. Note that the "control for suppressing the torque shock at the initial combustion" in hybrid vehicles such as the hybrid vehicle HV is a conventional technology (e.g., Japanese Patent Application Publication No. 2005-30281 (JP-2005-30281 A)) so that the description thereof will be omitted. When the sixth control is executed, since the "control for suppressing the torque shock at the initial combustion" of the engine 1 is not performed, the torque including the torque shock outputted from the engine 1 is not canceled out by the torque outputted from the motor generator MG2. Consequently, it is possible to improve the startability of the engine 1.

Thus, when the vehicle system activation operation is received by the operation reception unit 204 during the running of the hybrid vehicle HV and the engine 1 is started, since the "startability improvement control" for improving the startability of the engine 1 as compared with the startability thereof when the vehicle system activation operation is received by the operation reception unit 204 during the stop of the hybrid vehicle HV and the engine 1 is started is executed, it is possible to reliably start the engine 1.

In addition, when the power switch 73 is operated by mistake during the running of the hybrid vehicle HV and the "ready-off state" is established, the driver desires to quickly and reliably establish the "ready-on state". As described above, since it is possible to reliably start the engine 1 by depressing the power switch 73 during the running of the hybrid vehicle HV, it is possible to quickly and reliably establish the "ready-on state". Further, since the engine 1 is reliably started, the driver can easily realize that the "vehicle system activation operation" as the operation for establishing the "ready-on state" is received.

Note that, in the embodiment, although a description has been given of the case where the "startability improvement control" is executed when the vehicle system activation operation is received during the running of the hybrid vehicle HV, a configuration may also be adopted in which the "startability improvement control" is invariably executed when the engine 1 is started during the running of the hybrid vehicle HV. In this configuration, when the engine 1 is started during the running of the hybrid vehicle HV, the "startability improvement control" is invariably executed and the startability of the engine 1 is thereby improved. Consequently, it is possible to reliably start the engine 1.

In addition, in the embodiment, although a description has been given of the case where the "startability improvement control" is executed when the vehicle system activation operation is received during the running of the hybrid vehicle HV, a configuration may also be adopted in which the "startability improvement control" is invariably executed when the vehicle system activation operation is received. In this configuration, when the vehicle system activation operation is received and the engine 1 is started, the "startability improvement control" is invariably executed and the startability of the engine 1 is thereby improved. Consequently, it is possible to reliably start the engine 1.

Further, in the embodiment, although a description has been given of the case where the "startability improvement control" includes the first to sixth controls, the "startability improvement control" may appropriately include at least one of the first to sixth controls. For example, a configuration may be adopted in which the "startability improvement control" includes only the first control or includes the first to third controls. Note that, out of the first to sixth controls, as the number of controls included in the "startability improvement control" is larger, the effect of improving the startability is larger. Note that, out of the first to sixth controls, as the number of controls included in the "startability improvement control" is smaller, the structure of the apparatus is simpler.

Figure 6:
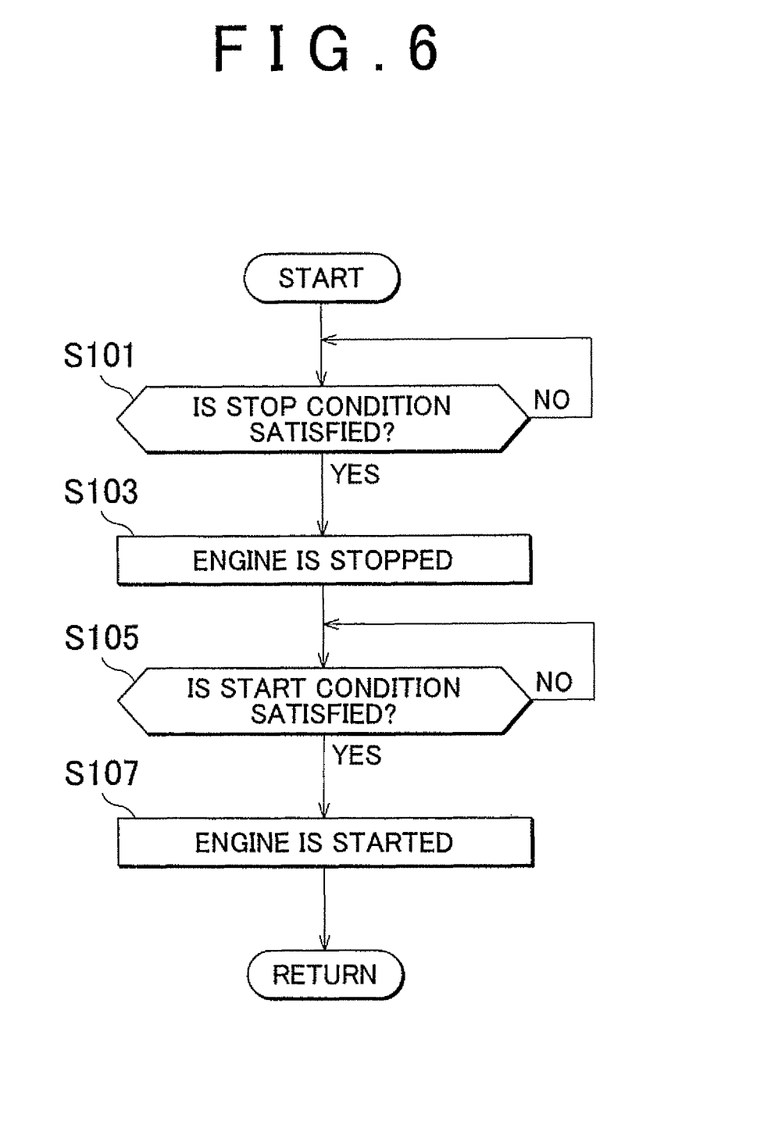
FIG. 6 is a flowchart showing examples of an automatic stop operation and an automatic restart operation of the engine by the control apparatus for a vehicle shown in FIG. 5.
Figure 7:
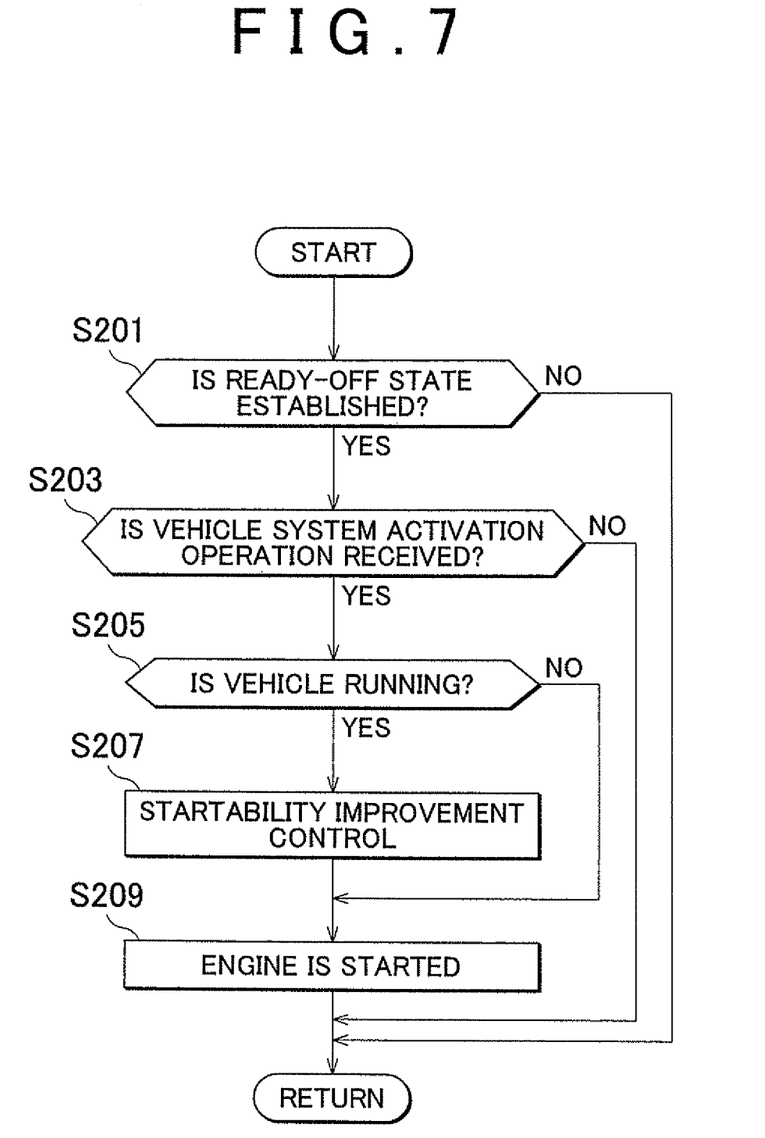
FIG. 7 is a flowchart showing an example of a startability improvement operation of the engine by the control apparatus for a vehicle shown in FIG. 5.

Next, with reference to FIGS. 6 and 7, a description will be given of the operation of the control apparatus for a vehicle according to the invention (ECU 200). FIG. 6 is a flowchart showing an example of each of an automatic stop operation and an automatic restart operation of the engine 1 by the control apparatus for a vehicle (ECU 200) shown in FIG. 5. FIG. 7 is a flowchart showing an example of the startability improvement operation of the engine 1 by the control apparatus for a vehicle (ECU 200) shown in FIG. 5. Note that, in FIG. 6, the engine 1 is assumed to be started as the initial state thereof for the sake of convenience.

As shown in FIG. 6, the stop unit 202 firstly determines whether or not the "stop condition" is satisfied (Step S101).

When NO is determined in Step S101, this process is brought into a standby state. When YES is determined in Step S101, the process advances to Step S103. Next, the engine 1 is stopped by the stop unit 202 (Step S103).

Subsequently, the start unit 203 determines whether or not the "start condition" is satisfied (Step S105). When NO is determined in Step S105, the process is brought into the standby state. When YES is determined in Step S105, the process advances to Step S107. Next, the engine 1 is started by the start unit 203 (Step S107). Then, the process returns to Step S101, and the process from Step S101 is repeatedly executed.

In addition, as shown in FIG. 7, the operation reception unit 204 firstly determines whether or not the "ready-off state" is established (Step S201). When NO is determined in Step S201, the process is brought into the standby state. When YES is determined in Step S201, the process advances to Step S203. Next, the operation reception unit 204 determines whether or not the vehicle system activation operation is received (Step S203). When NO is determined in Step S203, the process returns to Step S201 and the process from Step S201 is repeatedly executed. When YES is determined in Step S203, the process advances to Step S205.

Next, the control execution unit 205 determines whether or not the hybrid vehicle HV is running (Step S205). When YES is determined in Step S205, the process advances to Step S207. When NO is determined in Step S205, the process advances to Step S209.

Subsequently, the control execution unit 205 executes the "startability improvement control" for improving the startability of the engine 1 (Step S207). Then, the engine 1 is started by the control execution unit 205 (Step S209). Next, the process returns to Step S201, and the process from Step S201 is repeatedly executed.

Thus, when the vehicle system activation operation is received by the operation reception unit 204 during the running of the hybrid vehicle HV and the engine 1 is started, since the "startability improvement control" for improving the startability of the engine 1 is executed, it is possible to reliably start the engine 1.

In the embodiment, although a description has been given of the case where the control apparatus for a vehicle according to the invention is constituted as the functional unit of each of the stop unit 202, the start unit 203, the operation reception unit 204, and the control execution unit 205 in the ECU 200, a configuration may also be adopted in which the functional unit of at least one of the stop unit 202, the start unit 203, the operation reception unit 204, and the control execution unit 205 is constituted by hardware such as an electronic circuit or the like.

In the embodiment, although a description has been given of the case where the vehicle is what is called a "series/parallel type" hybrid vehicle HV, a configuration may also be adopted in which the vehicle is a "series type" or "parallel type" hybrid vehicle.

In the embodiment, although a description has been given of the case where the vehicle is the FF hybrid vehicle HV, a configuration may also be adopted in which the vehicle is an FR or 4WD hybrid vehicle.

In addition, in the embodiment, although a description has been given of the case where the two motor generators MG1 and MG2 are provided in the hybrid vehicle HV, a configuration may also adopted in which one motor generator or three or more motor generators are provided in the hybrid vehicle. For example, a configuration may be adopted in which, in addition to the first motor generator MG1 and the second motor generator MG2, a third motor generator for driving a rear wheel axle is provided in the hybrid vehicle HV of the invention.

In the embodiment, although a description has been given of the case where the power switch 73 is a push switch, the power switch 73 may be any switch as long as the switch can receive the operation. For example, a configuration may also be adopted in which the power switch 73 is a lever switch, a slide switch, or a key switch in which a key is inserted into a cylinder and rotated.

In the embodiment, although a description has been given of the case where the vehicle is the hybrid vehicle HV, the control apparatus for a vehicle according to the invention can also be applied to a conventional vehicle (having only the engine as the drive source). In this case, the "stop condition" determined in the stop unit 202 is a condition for what is called "automatic stop" for improving fuel efficiency, and the "start condition" determined in the start unit 203 is a condition for "automatic restart". In addition, the operation reception unit 204 receives an "ignition ON operation" instead of the "vehicle system activation operation".

The invention can be used in the control apparatus for the vehicle on which the running drive source is mounted. In particular, the invention can be suitably used in the control apparatus for the hybrid vehicle on which the internal combustion engine and the motor are mounted as the drive sources.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A control apparatus for a vehicle that includes an internal combustion engine and a motor as drive sources, the control apparatus comprising:
   an operation reception unit that receives a vehicle system activation operation for allowing at least one of the internal combustion engine and the motor to output a driving force;
   a stop unit that stops the internal combustion engine when a stop condition for stopping the internal combustion engine is satisfied;
   a start unit that starts the internal combustion engine when a start condition for starting the internal combustion engine is satisfied after the internal combustion engine has been stopped by the stop unit, the start condition being different from the vehicle system activation operation received by the operation reception unit; and
   a control execution unit that executes a startability improvement control that improves startability of the internal combustion engine when the vehicle system activation operation is received by the operation reception unit during running of the vehicle as compared with the startability of the internal combustion engine when the internal combustion engine is started when the start condition is satisfied during the running of the vehicle after the internal combustion engine has been stopped due to the stop condition having been previously satisfied.

2. The control apparatus according to claim 1, wherein the startability improvement control includes at least one of (i) a control for increasing a fuel injection amount to the internal combustion engine, (ii) a control for starting fuel injection even when a rotational speed of the internal combustion engine is below a threshold, (iii) a control for prohibiting execution of a catalyst warm-up control for retarding an ignition timing of the internal combustion engine, (iv) a decompression control for retarding an opening time of an intake valve of the internal combustion engine, (v) a control for prohibiting execution of a vibration damping control for preventing torque pulsation of the internal combustion engine, and (vi) a control for prohibiting execution of a control for suppressing a torque shock at an initial combustion of the internal combustion engine.

3. The control apparatus according to claim 1, wherein the operation reception unit includes a vehicle power switch.

4. A control apparatus for a vehicle that includes an internal combustion engine as a drive source, the control apparatus comprising:
an operation reception unit that receives a start operation for starting the internal combustion engine;
a stop unit that stops the internal combustion engine when a stop condition for stopping the internal combustion engine is satisfied;
a start unit that starts the internal combustion engine when a start condition for starting the internal combustion engine is satisfied after the internal combustion engine has been stopped by the stop unit, the start condition being different from the start operation received by the operation reception unit; and
a control execution unit that executes a startability improvement control that improves startability of the internal combustion engine when the start operation is received by the operation reception unit during running of the vehicle as compared with the startability of the internal combustion engine when the internal combustion engine is started when the start condition is satisfied during the running of the vehicle after the internal combustion engine has been stopped due to the stop condition having been previously satisfied.

5. The control apparatus according to claim 4, wherein the startability improvement control includes at least one of (i) a control for increasing a fuel injection amount to the internal combustion engine, (ii) a control for starting fuel injection even when a rotational speed of the internal combustion engine is below a threshold, (iii) a control for prohibiting execution of a catalyst warm-up control for retarding an ignition timing of the internal combustion engine, (iv) a decompression control for retarding an opening time of an intake valve of the internal combustion engine, (v) a control for prohibiting execution of a vibration damping control for preventing torque pulsation of the internal combustion engine, and (vi) a control for prohibiting execution of a control for suppressing a torque shock at an initial combustion of the internal combustion engine.

6. The control apparatus according to claim 4, wherein the operation reception unit includes a vehicle power switch.

7. A control apparatus for a vehicle that includes an internal combustion engine and a motor as drive sources, the control apparatus comprising:
an electronic control unit configured to:
receive a vehicle system activation operation signal that allows at least one of the internal combustion engine and the motor to output a driving force;
cause the internal combustion engine to stop operating when a stop condition for stopping the internal combustion engine is satisfied;
cause the internal combustion engine to start operating when a start condition for starting the internal combustion engine is satisfied after the internal combustion engine has been stopped due to the stop condition having been previously satisfied, the start condition being different from the vehicle system activation operation signal; and
execute a startability improvement control that improves startability of the internal combustion engine when the vehicle system activation operation signal is received by the electronic control unit during running of the vehicle as compared with the startability of the internal combustion engine when the internal combustion engine is started when the start condition is satisfied during the running of the vehicle after the internal combustion engine has been stopped due to the stop condition having been previously satisfied.

8. The control apparatus according to claim 7, wherein the startability improvement control includes at least one of (i) a control for increasing a fuel injection amount to the internal combustion engine, (ii) a control for starting fuel injection even when a rotational speed of the internal combustion engine is below a threshold, (iii) a control for prohibiting execution of a catalyst warm-up control for retarding an ignition timing of the internal combustion engine, (iv) a decompression control for retarding an opening time of an intake valve of the internal combustion engine, (v) a control for prohibiting execution of a vibration damping control for preventing torque pulsation of the internal combustion engine, and (vi) a control for prohibiting execution of a control for suppressing a torque shock at an initial combustion of the internal combustion engine.

9. The control apparatus according to claim 7, further comprising:
a vehicle power switch,
wherein the electronic control unit receives the vehicle system activation operation signal from the vehicle power switch.

10. A control apparatus for a vehicle that includes an internal combustion engine as a drive source, the control apparatus comprising:
an electronic control unit configured to:
receive a vehicle start operation signal that instructs to start the internal combustion engine;
cause the internal combustion engine to stop operating when a stop condition for stopping the internal combustion engine is satisfied;
cause the internal combustion engine to start operating when a start condition for starting the internal combustion engine is satisfied after the internal combustion engine has been stopped due to the stop condition having been previously satisfied, the start condition being different from the vehicle start operation signal; and
execute a startability improvement control that improves startability of the internal combustion engine when the vehicle start operation signal is received by the electronic control unit during running of the vehicle as compared with the startability of the internal combustion engine when the internal combustion engine is started when the start condition is satisfied during the running of the vehicle after the internal combustion engine has been stopped due to the stop condition having been previously satisfied.

11. The control apparatus according to claim 10, wherein the startability improvement control includes at least one of (i) a control for increasing a fuel injection amount to the internal combustion engine, (ii) a control for starting fuel injection even when a rotational speed of the internal combustion engine is below a threshold, (iii) a control for prohibiting execution of a catalyst warm-up control for retarding an ignition timing of the internal combustion engine, (iv) a decompression control for retarding an opening time of an intake valve of the internal combustion engine, (v) a control for prohibiting execution of a vibration damping control for preventing torque pulsation of the internal combustion engine, and (vi) a control for prohibiting execution of a control for suppressing a torque shock at an initial combustion of the internal combustion engine.

12. The control apparatus according to claim 10, further comprising:
a vehicle power switch,
wherein the electronic control unit receives the vehicle start operation signal from the vehicle power switch.

* * * * *